No. 785,724. Patented March 28, 1905.

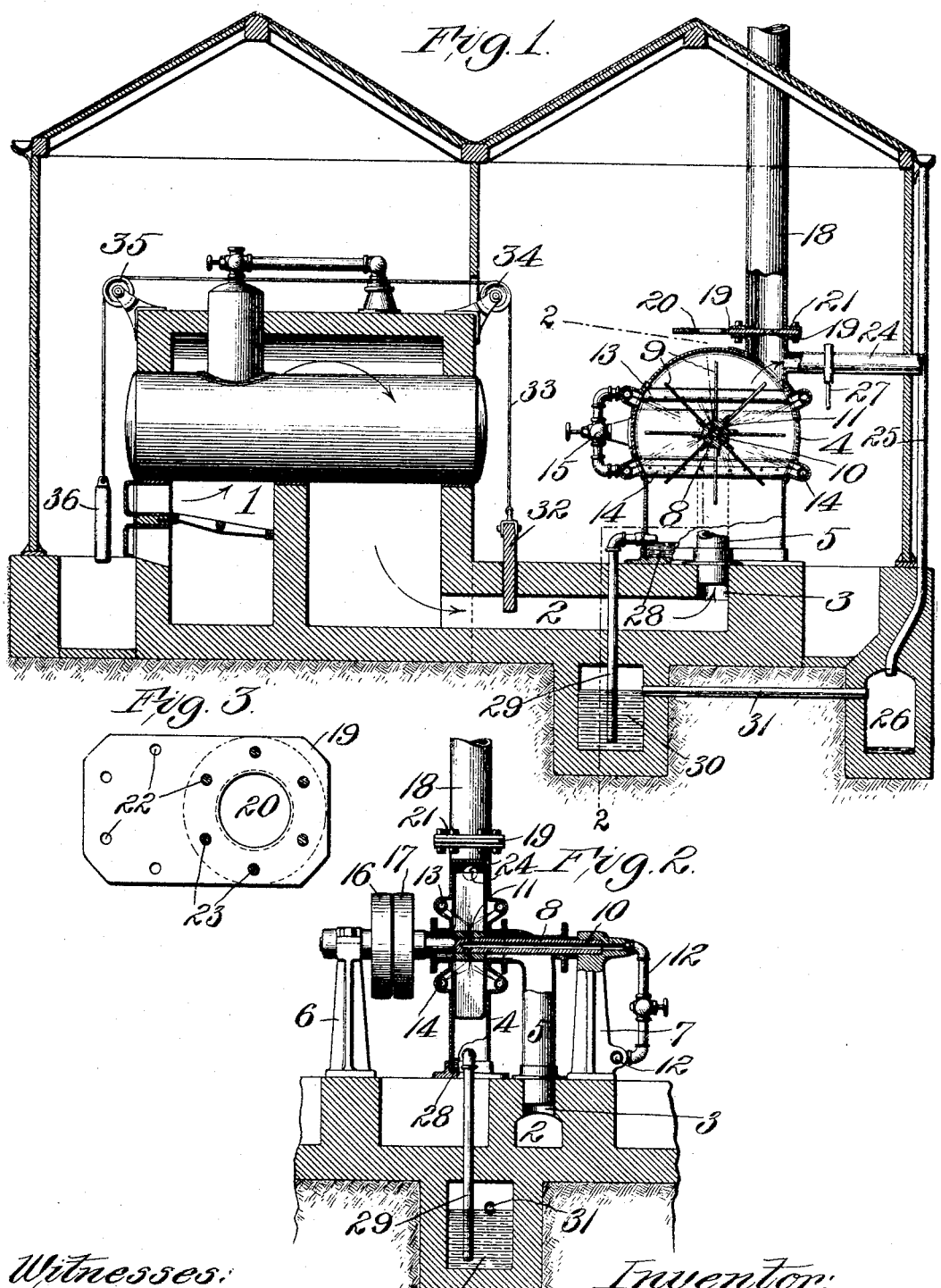

UNITED STATES PATENT OFFICE.

PETER EYERMANN, OF ST. LOUIS, MISSOURI, ASSIGNOR OF ONE-FOURTH TO CARL HUBER, OF ST. LOUIS, MISSOURI.

FURNACE SMOKE-PREVENTING DEVICE.

SPECIFICATION forming part of Letters Patent No. 785,724, dated March 28, 1905.

Application filed May 23, 1904. Serial No. 209,280.

*To all whom it may concern:*

Be it known that I, PETER EYERMANN, a citizen of the United States, residing at St. Louis, Missouri, have invented a certain new and useful Improvement in Furnace Smoke-Preventing Devices, of which the following is a full, clear, and exact description, such as will enable others skilled in the art to which it appertains to make and use the same, reference being had to the accompanying drawings, forming part of this specification, in which—

Figure 1 is a vertical longitudinal sectional view through a gas-purifier constructed in accordance with my invention, parts being shown in elevation and the apparatus being illustrated as applied to a steam-boiler furnace. Fig. 2 is a cross-sectional view on the line 2 2 of Fig. 1, and Fig. 3 is a plan view of a cut-off.

This invention relates to an apparatus for purifying gases.

The invention is illustrated as being applied in connection with a steam-boiler furnace to separate the products of combustion from the gases.

As is generally known, the gases escaping from steam-boiler furnaces are highly impregnated with fine particles of slate, clay, slack, soot, and carbons, resulting from the combustion of the fuel, and the escape of these carbonized gases into the atmosphere is extremely injurious and annoying.

It is the purpose of this invention to remove the carbon or mineral dust from the escaping gases and permit only the pure gases to escape into the atmosphere, the precipitated products being confined within a given space from which they can subsequently be removed.

The invention is also applicable to use in removing impurities from air or any gaseous fluid, and I therefore do not limit myself to its application in connection with a steam-boiler, but desire to have it understood that I reserve the right to its use for any purpose for which it may be utilized.

In carrying out my invention as applied to a steam-boiler furnace the smoke-exhaust flue is preferably located at the bottom of the base or beneath the support therefor.

The numeral 1 designates a boiler-furnace with the usual appurtenances, the products of combustion following the path indicated by the arrow. Communicating with the interior of the furnace and leading from the bottom thereof is a flue 2.

3 is the outlet for the flue, which is in communication with a fan-casing 4 through the medium of a tubular connection 5. The fan-casing comprises a part of the gas-purifying device, into which the gases are introduced and freed from the mineral dust, &c. On the respective sides of the casing are standards 6 and 7, having journals in their upper extremities, in which is revolubly mounted a shaft 8, extending from the casing and carrying the radial fan-blades 9. The shaft 8 may be solid or it may be a hollow shaft. If formed hollow, the central longitudinal conduit 10 will be punctured or provided with escape-openings 11 adjacent to the inner ends of the fan-blades, the openings 11 being of such form as to introduce a suitable liquid, preferably water, in the form of a jet or spray. The hollow shaft can be coupled to a suitable supply pipe or main 12, whereby the necessary liquid can be supplied.

It is to be understood that it is the object of this invention to bring the products of combustion into intimate contact with the spray formed by the injected liquid. In order to provide the necessary moisture and assist in the efficiency of the device, I prefer to arrange a plurality of perforate injector-pipes 13 and 14, which may be suitably connected, the escape-openings being in communication with the interior of the casing 4, as clearly indicated in Fig. 1. These pipes 13 and 14 may be controlled by a single valve 15, and they may receive their supply from a suitable source. (Not shown.) On the shaft 8 are the idle and driving pulleys 16 and 17, respectively, so that the shaft can be suitably driven. Leading from the casing 4 is a flue or chimney 18, and immediately above the inlet to the chimney 18 is a valve or cut-off, which may consist of a suitable plate 19, divided into a perforate end and an imperforate end. The perforate end is provided with an opening 20 of substantially the same diameter as the flue or chimney 18. The flue or chimney 18 is provided with a flanged guide 21 for the reception of the cut-off 19.

By reference to Fig. 3 it will be observed that the cut-off is provided with suitable openings, (designated by the numeral 22,) which are adapted to register with similar openings in the flanges of the guide or seat 21. This cut-off is reversible—that is to say, either the opening can be caused to register with the opening in the chimney 18 or the imperforate part of the cut-off can be caused to register with the opening in the chimney 18. In the latter event the passage of the gases through the flue will be obstructed. The openings 23 in the cut-off 19 serve as receiving-openings for the bolts in either position of the cut-off when the cut-off is secured in the chimney in a manner heretofore described. The passage of the gases through the flue or chimney 18 will be permitted only when it is desired to create a forced draft in the furnace or when the fan is not properly performing its functions. The branch flue 24, leading from the fan-casing, is illustrated as being in communication with the usual sewer-pipe 25, communicating with the sewer 26. However, it is obvious that the flue 24 may have its escape end independent of this pipe and arranged as convenience may suggest.

When the smoke or gases are passing through the flue or chimney 18, the communication through the pipe 24 will be cut off by the valve 27. The lower portion of the casing 4 is closed to comprise a receptacle 28 to receive the liquid, which has become impregnated with the carbonized products or other foreign elements in the gas.

29 is an overflow-pipe which leads from the catch-receptacle 28 to a trap 30, in communication with the sewer 26 through the medium of a pipe or tubular connection 31.

32 is a damper to which is secured a flexible connection 33, passing over the pulleys 34 and 35 on the furnace, and at one end of the connection 33 is a counterbalance-weight 36, whereby the damper 32 may be adjusted to control the draft through the flue 2.

Suppose the invention is being utilized with a steam-boiler furnace, as illustrated. The gases will pass through the flue 2 into the cleaning apparatus, where the fan will agitate the gases until the liquid spray and gases unite. The liquid will cause the solid or mineral dust to commingle therewith, so that it can be thrown out against the walls of the casing by the centrifugal action of the fan. The specific gravity of this matter being greater than the gas, it will drop to the lower portion of the casing into the receptacle 28, where the liquid can be drawn off through the pipe 29. The gas will ordinarily pass out through the pipe 24 either into the sewer-pipe 25 or escape into atmosphere as prearranged. If the pipe 24 is in communication with the pipe 25, the tendency of the carbonic-acid gas will be to drop into the sewer 26, whence it may be carried off. If for any reason it is desired to permit the gas to escape through the flue or chimney 18, this can be done in an obvious manner.

Attention is directed to the fact that the inside water-cooled fan not only serves the purpose of acting as a purifying element for the gases, but also assists in accelerating the draft by providing a lower pressure within the fan-casing which is the result of suddenly reducing the volume of the entering hot gases, which draft can be controlled by the damper 32.

This invention can be modified to be applicable to ships or vessels whereby the air introduced into the ship by means of ventilators or blowers may be purified.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In an apparatus of the class described, the combination with a gas-receiving casing, a rotating fan in the casing adapted to separate foreign particles from the gas and precipitate them against the side of the casing by centrifugal force, a receptacle at the bottom of the casing for receiving the precipitated matter, fluid-injectors coöperating with the fan, an overflow leading from the receptacle in the bottom of the casing, an escape main flue leading from the casing, and a secondary escape-flue; substantially as described.

2. The combination with a gas-receiving casing, a plurality of rotating fan-blades in the casing, means for introducing liquid sprays between the fan-blades, a primary flue leading from the casing, a secondary flue leading from the casing, and a reversible device in the secondary flue for opening and closing said secondary flue; substantially as described.

3. In a device of the class described, the combination with a gas-receiving casing, means for precipitating foreign substances from the gases, a main escape-flue leading from the casing, a secondary escape-flue having a removable and reversible plate, one end of which is perforate and the other imperforate whereby the passage in the flue may be opened and closed; substantially as described.

4. In an apparatus of the class described, the combination with a furnace, a gas-receiving casing remote from the furnace and communicating therewith, a rotating fan in the casing adapted to separate foreign particles from the gas and precipitate them against the side of the casing by centrifugal force, a receptacle at the bottom of the casing for receiving the precipitated matter, fluid-injectors coöperating with the fan, an overflow-pipe leading from the receptacle in the bottom of the casing, said overflow-pipe and receptacle being remote from the furnace, and an escape-flue, leading from the casing direct to outside atmosphere, whereby the gases may pass from the casing; substantially as described.

5. The combination with a gas-receiving casing, a hollow shaft within the casing provided with perforations, fan-blades carried by the hollow shaft and alternating with the perforations, whereby a liquid spray can be introduced between the fan-blades, means for spraying liquid from the walls of the casing toward the shaft, an overflow-pipe leading from the receptacle in the bottom of the casing, and a gas-escape pipe leading from the top of the casing; substantially as described.

In testimony whereof I hereunto affix my signature, in the presence of two witnesses, this 19th day of May, 1904.

PETER EYERMANN.

Witnesses:
B. F. FUNK,
GEORGE BAKEWELL.